J. WORICK.
Governors for Horse-Powers.

No. 219,558. Patented Sept. 9, 1879.

WITNESSES:
Jas. F. DuHamel
J. W. Garner

INVENTOR:
J. Worick,
per
F. A. Lehmann,
Atty

UNITED STATES PATENT OFFICE.

JEREMIAH WORICK, OF RACINE, WISCONSIN.

IMPROVEMENT IN GOVERNORS FOR HORSE-POWERS.

Specification forming part of Letters Patent No. 219,558, dated September 9, 1879; application filed April 14, 1879.

*To all whom it may concern:*

Be it known that I, JEREMIAH WORICK, of Racine, in the county of Racine and State of Wisconsin, have invented certain new and useful Improvements in Governors for Horse-Powers and other Machines; and I do hereby declare the following to be a full, clear, and exact description of the invention, such as will enable others skilled in the art to which it pertains to make and use it, reference being had to the accompanying drawings, which form part of this specification.

My invention relates to an improvement in governors for irregular motions; and it consists in forming a flange on one edge of a pulley or gear-wheel and applying to the periphery of this flange frictional brakes or shoes, the pressure of which is regulated by means of springs or other elastic material, as will be more fully described hereinafter, whereby the most irregular motion from a horse-power or any other source is controlled and made as regular and even as any motion.

Figure 1:
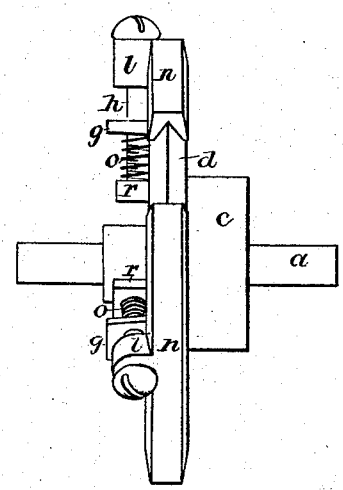
Figure 2:
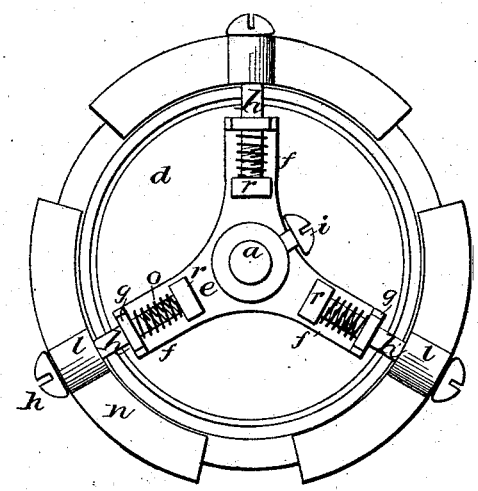
Figure 3:
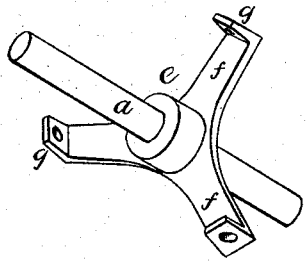

Figure 1 is an edge view of my invention. Fig. 2 is a side elevation of the same; and Fig. 3 is a detached view of the spider alone.

$a$ represents a common driving-shaft, and $c$ a pulley or gear-wheel turning loosely thereon. Formed on one side of this pulley or wheel is the disk or flange $d$, which has its edge formed V-shaped, or in any other way that may be preferred, so as to give additional frictional surface.

In close contact to the side of this disk or flange is the spider $e$, which is fastened rigidly to the shaft $a$ by means of a set-screw, $i$, or other suitable device. This spider has any suitable number of arms $f$, each one of which has a flange, $g$, on its outer end, having a hole through it for the passage of the tightening-bolt $h$. These bolts pass through eyes $l$, made on the sides of the frictional shoes or brakes $n$, through the holes in the flanges $g$, and receive a spring, $o$, or other elastic substance, and a nut, $r$, on their ends inside of the flanges or outside of the shoes or brakes $n$.

The brakes or shoes, of which there are any suitable number, generally corresponding to the number of arms on the spider, are shaped so as to fit the periphery of the flange or disk and have their pressure thereon regulated by means of the springs or other elastic substances. The pressure of the shoes on the disk is always sufficient to impart the motion of the horse-power, or from any other source, through the spider to the shaft. Should the motion of the pulley become too rapid, the centrifugal force of the shoes or brakes causes them to loosen their hold upon the periphery of the disk, and thus the pulley or wheel will slip around on the shaft without imparting this extra motion to the shaft.

By increasing or lessening the friction of the brakes or shoes, by means of the nuts and springs on the periphery of the disk, the motion of the shaft can be regulated to a nicety, and thus the most irregular motion from any source can be converted into one as regular as that obtained from steam.

Having thus described my invention, I claim—

1. The combination of a pulley, $c$, to which the belt is applied, having a flange, $d$, and turning loosely on the shaft, with the spider $e$, rods $h$, and springs $o$, the spider being fastened to the shaft, substantially as shown.

2. In a governor, the combination of the shaft $a$, pulley or wheel $c$, and flange $d$, turning loosely on the shaft, a spider, $e$, fastened to the shaft, and having arms $f$ and flanges $g$, shoe or shoes $n$, bolts $l$, springs or their equivalents, and nuts $r$, substantially as set forth.

In testimony that I claim the foregoing I have hereunto set my hand this 4th day of March, 1879.

JEREMIAH WORICK.

Witnesses:
T. H. QUINN,
JOHN W. KNIGHT.